United States Patent [19]

Bitton et al.

[11] Patent Number: 5,023,984
[45] Date of Patent: Jun. 18, 1991

[54] DEBURRING METHOD AND MACHINE

[75] Inventors: Max D. Bitton; Randall W. Wahlquist, both of Ogden, Utah

[73] Assignee: Westinghouse Electric Corp., Pittsburgh, Pa.

[21] Appl. No.: 483,562

[22] Filed: Feb. 22, 1990

[51] Int. Cl.$^5$ .................... B23D 79/02; B23P 9/00
[52] U.S. Cl. ........................ 29/81.05; 29/81.11;
 29/33 A; 51/128; 209/351; 209/311; 241/69
[58] Field of Search .................. 29/33 A, 76.3, 81.05,
 29/81.11, 81.12; 409/297; 51/59 R, 163.2, 313,
 7, 16, 17, 21, 58, 163.1, 128; 241/74, 79.2, 79.3,
 69, 85, 87, 91; 209/311, 313, 350, 351

[56] References Cited

U.S. PATENT DOCUMENTS 2,187,994  1/1940  Anderson ................ 51/128 X
3,831,577  8/1974  Price ........................ 125/26

FOREIGN PATENT DOCUMENTS 2644054  4/1978  Fed. Rep. of Germany ........ 51/128

Primary Examiner—Steven C. Bishop
Attorney, Agent, or Firm—Z. L. Dermer

[57] ABSTRACT

A method and machine adapted to deburr items having burrs, particularly pressed sponge metal compacts of zirconium or hafnium. The burrs are gently scraped away by one or more endlessly moving, substantially horizontal preferably rotary screens preferably of stainless steel wire, which carry the items to be deburred. An item-confining wall and a series of baffles are associated with each screen for guiding the items back and forth across the upper surface of the screen and for passing the items through a passageway in the confining wall. The shavings of deburred material drop through the screen and are collected below. Means, such as item turning chutes, are provided between screens so that opposite sides of an item to be deburred, such as a washer-shaped item having flat opposite sides, will be completely deburred in a single pass through the machine.

12 Claims, 2 Drawing Sheets

DEBURRING METHOD AND MACHINE

BACKGROUND OF THE INVENTION

1. Field of the Invention

The invention has to do with methods and machines for deburring items such as pressed metal products, e.g. compacts of finely divided sponge zirconium or hafnium metal.

2. Description of the Prior Art

In the production of sponge zirconium or hafnium compact metal products involving the pressing of particles of sponge zirconium or hafnium metal in a die under high pressure imparted by a piston, and usually a core rod, as in the production of flat washers for use in the fabrication of equipment and structures in the nuclear field, metal burrs often occur on the flat faces of the pressed product. Removal of these undesirable burrs has been difficult and costly. Various methods for removing such burrs have been tried, such as tumbling the products in a ball or rod mill, placing them on a vibrating screen, rubbing them together, and dragging them by a belt across a wear surface. However, these methods have generally resulted more in damage to the compacts than in effective removal of the burrs, largely due to the susceptibility of the sponge metal to galling.

SUMMARY OF THE INVENTION

In accordance with the invention, the items to be deburred are deposited on a horizontal, endlessly moving screen, where they are passed back and forth on the screen, during screen movement, by a series of stationary baffles arranged transversely above the screen within confining wall means, so as to intercept and redirect travel of the items across the screen as it moves and carries the items with it. The items rest in gentle scraping contact with the screen as it rotates. Gentleness of scraping contact is important with sponge metals to prevent galling.

Although the invention is specifically described herein as adapted to remove burrs projecting from and substantially normal to the opposite flat faces of a sponge metal product of washer configuration, the method and machine may be applied to sponge metal compacts of other shapes and, in fact, to other formed products in general where burrs must be removed from the material employed in the forming of such products.

In the particular embodiment of the machine illustrated and described herein, a pair of vertically and horizontally spaced-apart, rotating, spoked wheels having vertical axes of rotation are covered with respective scraping screens, preferably of stainless steel wire mesh. A zig zag series of baffles are positioned slightly above each screen within an annular confining wall, the individual baffles thereof running transversely of the screen. The items to be deburred are successively deposited directly onto the upper face of the screen of the first wheel.

As the screen-covered wheel rotates, the items deposited thereon are guided back and forth across the screen. As they travel across the screen, the burrs are gently scraped away and the burr shavings are pressed against and caused to drop through the screen into a receiving receptacle below.

Prior to a complete rotation of the screen, the item is guided by the baffles into a chute arranged to turn the item over and to drop it on to the second screen, which is equipped with baffles and a confining wall similar to those of the first screen, and prior to a complete rotation of the second screen, the completely deburred item is guided by the baffles into a second chute arranged to drop it into a receptacle for subsequent disposal, such as being packaged and shipped to customers for the product.

BRIEF DESCRIPTION OF THE DRAWING

An embodiment of machine representing the best mode presently contemplated for carrying out the invention in actual practice is illustrated in the accompanying drawing, in which.

DETAILED DESCRIPTION OF THE ILLUSTRATED EMBODIMENT

Figure 5:
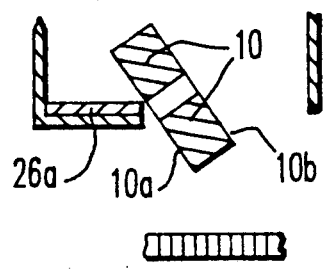
FIG. 5, a partial transverse vertical section taken along the line 5—5 of FIG. 2 to show details of the product-reversing chute.

In the form illustrated, the machine of the invention is constructed and arranged to carry out the method of the invention with respect to sponge zirconium metal compact products, see 10, FIG. 5, of round and flat washer formation produced by a conventional press 11 having a chute 11a for passing the compacted sponge metal products directly into the machine. Such products 10 normally have burrs (not shown) projecting more or less perpendicularly from their flat faces 10a and 10b.

Such machine comprises a pair of rotatable, spoked wheels 12 and 13, (see FIG. 1, spokes shown partially) each of which has its upper surface covered by a screen 14, preferably sixteen mesh, stainless steel wire. For clarity of illustration, the screens 14 are shown as covering only a portion of the respective wheels, but, in reality, they cover the entire top surface of each wheel. The primary considerations are that the screens be fine enough and of a material hard enough to effect a good scraping action against the projecting burrs and yet be coarse enough to permit the shavings to drop through for collection in a pan 15 (FIG. 2) or other receptacle placed below the wheel carrying the screen.

The wheels are driven by variable speed motors 16 and 17, respectively, through shafts 18 and 19, respectively.

It has been found that a machine so constructed and having screened wheels each sixteen inches in diameter will, when the screens rotate at sixty rpm, do an entirely satisfactory job on zirconium sponge compacts of washer formation having an external diameter of one and a half inches and a thickness of half an inch.

As illustrated, the machine is protectively enclosed by a housing 20 having a hinged lid 21 fabricated from expanded metal 22, which permits an operator to view the deburring process in operation.

Annular walls 23 and 24 are attached to the underside of lid 21 so as to be spaced slightly above and to closely surround the respective screens 14 when lid 21 is closed. Wall 23 has a passageway 25 leading into a chute 26, while wall 24 has passageways 27 and 28. Chute 26 leads into passageway 27, while passageway 28 leads into a chute 29 emptying into a receiver 30 for deburred products. Series of guide baffles are attached to the underside of lid 21 within the confines of annular walls 23 and 24, respectively, being strategically arranged above the respective screens 14 when lid 21 is closed to guide the individual products back and forth across the screens. As shown, there are five baffles 31 through 35, respectively, in the series associated with the first screen and four baffles 37 through 40 respectively, associated with the second screen. All of the baffles and their surrounding walls have height somewhat greater than the thickness of the items to be deburred but so as to be spaced above the screens when lid 21 is closed.

The washer-configured sponge compacts 10 are deposited flatwise on the first screen 14 by the removable chute part 11a of press 11, which communicates with chute part 11b attached to lid 21 thus permitting raising and lowering of such lid. The wheels 12 and 13 and the screens 14 carried thereby are rotated clockwise. The deposited products 10 to be deburred follow zig zag paths as they travel across the respective screens, see the dash lines 42 and 43 in FIG. 1. The burrs are scraped off and drop as shavings through the screen into pan 15.

Figure 1:
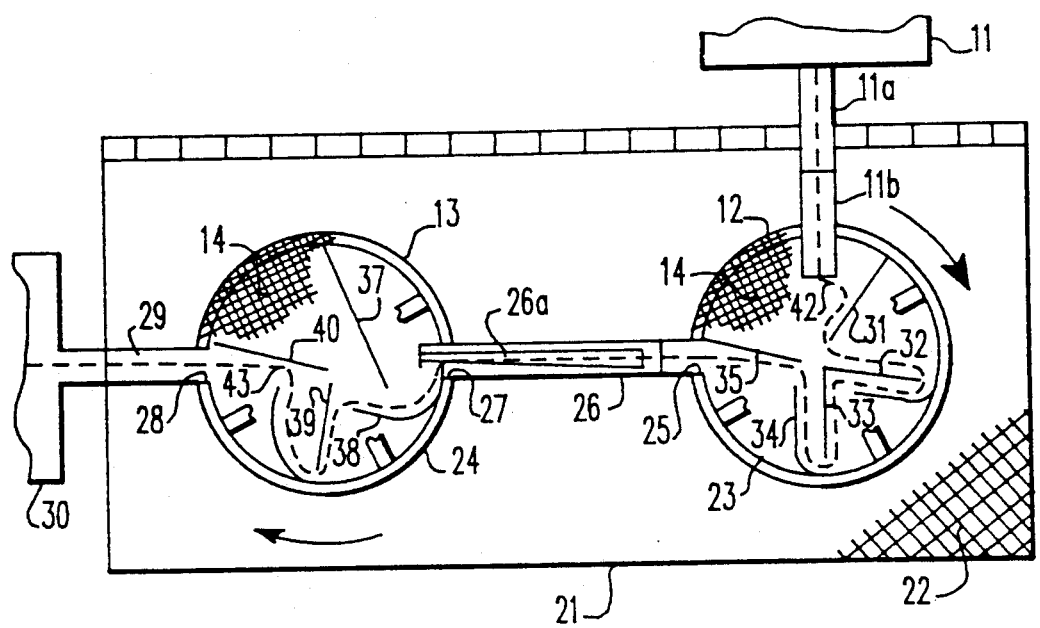
FIG. 1, is a schematic plan view of the machine with hinged lid closed but shown largely in outline, with a press and feed chute to the machine indicated schematically.
Figure 2:
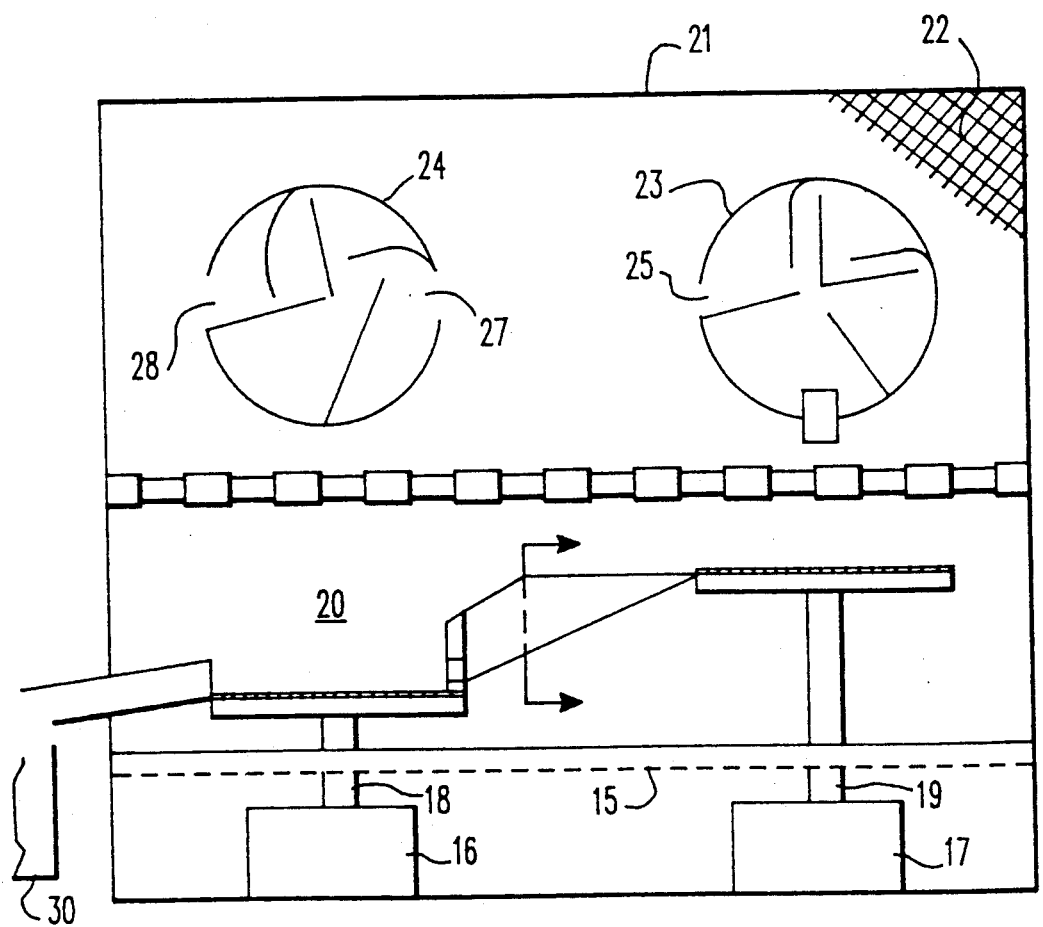
FIG. 2, a schematic front elevation of the machine, with lid open and the front panel of the housing removed to reveal interior parts.
Figure 3:
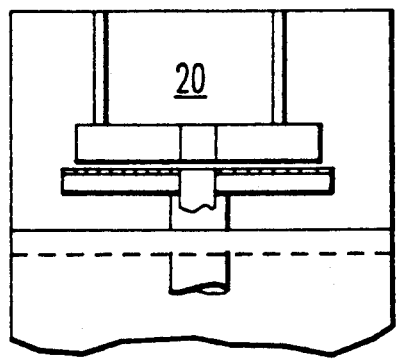
FIG. 3, a fragmentary schematic elevation of the left side of the machine, with the lid closed and the left panel of the housing removed.
Figure 4:
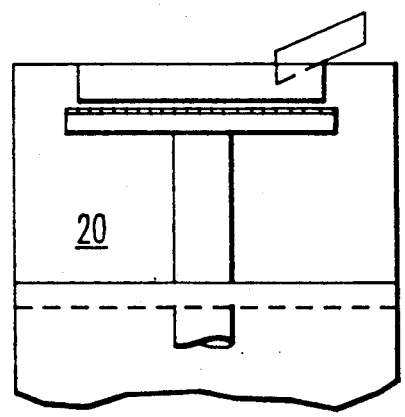
FIG. 4, a similar view of the right side of the machine.

After traversing the first screen 14, the sponge compacts 10 pass through passageway 25 into chute 26 and are turned over by the progressively narrowing trapezoidal bed 26a of chute 26, FIGS. 1 and 5, which becomes too narrow at its distal end to support the washer-shaped compact thus allowing it to tip over and be deposited on the second screen 14 with its as yet undeburred side uppermost. After traversing such second screen 14 along a zig zag path, as effected by the second series of baffles 37 through 40 associated with such second screen, the now completely deburred products 10 pass through passageway 28 into discharge chute 29 and finally into receiver 30.

The configuration, number, and placement of the guide baffles in the respective series of baffles are not critical and may be varied considerably to accomplish their purpose of causing zig zag travel across the screens and pushing of the deburred items through the openings in the otherwise confining walls and into the chutes. Other configurations of endlessly moving screens may be used with other shaped items to effect scraping off of burrs from such items whether or not they require being turned over for the purpose.

Whereas this invention is here illustrated and described with reference to a specific embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim as our invention:

1. A method of deburring a product having burrs after being formed, comprising the steps of depositing such a product on the upper surface of an endlessly, substantially horizontal, movable screen which has spaced above it a series of baffles within product-confining wall means, such baffles being arranged to cause the deposited product to travel back and forth across the screen as the screen moves and to carry the product with it; moving said screen with the deposited product thereon so as to effect a gentle scraping motion between said burrs and said screen, and causing the shavings resulting from said scraping motion to pass through the openings of said screen for collection; and removing the product from the screen.

2. A method according to claim 1, wherein there are a plurality of the movable screens and the product has flat surfaces, the product being deposited flatwise on a first of said movable screens; and wherein the product is passed through turning means from one to another of said movable screens so as to be deposited on a different flat surface on a successive one of said movable screens.

3. A method according to claim 2, wherein the product is of flat washer configuration and is turned from one flat side to the other flat side thereof between successive screens.

4. A method according to claim 3, wherein the product is a pressed, sponge metal compact.

5. A method according to claim 4, wherein the sponge metal is zirconium or hafnium.

6. A machine for deburring a product of material having burrs after being formed, comprising a substantially horizontal screen mounted for endless movement in a substantially horizontal plane and adapted to have such a product deposited on its upper surface; means for supporting and for moving said screen endlessly; confining wall means and a series of baffles within said confining wall means, both the baffles of said series and said confining wall means being associated with and spaced and supported above said screen so as to confine on said screen a product to be deburred that is deposited on and carried by said screen and so as to cause and guide movement of said product relative to, and back and forth across, said screen as the screen moves and carries the product with it; and means for removing the product from the screen.

7. A machine according to claim 6, wherein the means for supporting and moving the screen is of wheel formation having a rim defining interior space for receiving material passed through the screen.

8. A machine according to claim 6, wherein the screen is of stainless steel wire.

9. A machine for deburring products having burrs after being formed, comprising: a pair of substantially horizontal screens mounted for endless movement in substantially horizontal planes and adapted to have such products deposited on their upper surfaces; means for supporting and for moving said screens endlessly; confining wall means and a series of baffles within said confining wall means, both the baffles of said series and said confining wall means being associated with and spaced and supported above said screens so as to confine on said screens products to be deburred that are deposited on and carried by said screens and so as to cause and guide movement of said products relative to, and back and forth across, said screens as said screens move and carry the products; and means for removing the products from the screens; wherein one of said screens succeeds the other of said screens in a line of travel of the products, said succeeding screen and associated wall and baffles being spaced below the screen that is before it in the line of travel of the products to be deburred from screen to screen and positioned so as to receive such products from the screen that is before it.

10. A machine according to claim 9, wherein there is a product-turning chute between the succeeding screen and associated wall and baffles and the screen that is before said succeeding screen, the product removing means comprising a passageway through the confining wall associated with the said screen that is before, the baffles associated with the said screen that is before being arranged to guide the product through said passageway.

11. A machine according to claim 10, wherein the removing means also comprises a product discharge passageway through the confining wall associated with the succeeding screen, the baffles associated with the said succeeding screen being arranged to guide the product through said passageway.

12. A machine according to claim 11, wherein the removing means also comprises a discharge chute communicating with the product discharge passageway.

* * * * *